US011017133B2

(12) United States Patent
Fan et al.

(10) Patent No.: US 11,017,133 B2
(45) Date of Patent: May 25, 2021

(54) METHODS AND SYSTEMS FOR MANUFACTURING PRODUCTS/PARTS MADE OF CARBON FIBER REINFORCED COMPOSITE BASED ON NUMERICAL SIMULATIONS

(71) Applicant: Livermore Software Technology Corporation, Livermore, CA (US)

(72) Inventors: Houfu Fan, Livermore, CA (US); Xinhai Zhu, Pleasanton, CA (US)

( * ) Notice: Subject to any disclaimer, the term of this patent is extended or adjusted under 35 U.S.C. 154(b) by 331 days.

(21) Appl. No.: 16/115,437

(22) Filed: Aug. 28, 2018

(65) Prior Publication Data

US 2019/0258763 A1 Aug. 22, 2019

Related U.S. Application Data

(63) Continuation-in-part of application No. 15/898,426, filed on Feb. 17, 2018, now Pat. No. 10,699,042.

(51) Int. Cl.
*G06F 30/23* (2020.01)
*G06T 15/10* (2011.01)
*G06F 111/10* (2020.01)
*G06F 119/18* (2020.01)

(52) U.S. Cl.
CPC ........... *G06F 30/23* (2020.01); *G06T 15/10* (2013.01); *G06F 2111/10* (2020.01); *G06F 2119/18* (2020.01)

(58) Field of Classification Search
CPC . G06T 15/10; G06T 19/20; G06T 2219/2021; G06F 17/5018; G06F 2111/10; G06F 2113/26; G06F 2119/18; G06F 2217/12; G06F 2217/16; G06F 30/23
USPC ............................................................ 703/7
See application file for complete search history.

(56) References Cited

U.S. PATENT DOCUMENTS

| 10,699,042 B2* | 6/2020 | Zhu .................... G06F 30/17 |
| 2015/0170022 A1* | 6/2015 | Malik .................... G06N 3/084 706/21 |
| 2017/0259502 A1* | 9/2017 | Chapiro ................. B33Y 10/00 |
| 2018/0321659 A1* | 11/2018 | Dasappa ............ G05B 19/4099 |

* cited by examiner

*Primary Examiner* — Justin C Mikowski

(57) ABSTRACT

First FEA mesh model representing 3-D geometry of a carbon fiber reinforced composite (CFRC) product/part, pre-forming fiber orientation and desired reference fiber direction at a particular location on the product/part are received. First FEA mesh model contains finite elements associated with respective material properties for carbon fibers and binding matrix. Pre-forming fiber orientation includes number of fibers and relative angles amongst the fibers. Pre-forming 2-D shape of a workpiece used for manufacturing the product/part is obtained by conducting a one-step inverse numerical simulation that numerically expands the first to a second FEA mesh model based on numerically-calculated structural behaviors according to respective material properties. Pre-forming fiber orientation is superimposed on the second FEA mesh model with the desired reference fiber direction being preserved. Relative angles amongst all of the fibers on the product/part are determined by correlating the superimposed fiber orientation of the second to the first FEA mesh model.

18 Claims, 9 Drawing Sheets

100

102 — Receive, in a computer system having a FEA based application module capable of analyzing CFRC installed thereon, a first FEA mesh model representing 3-D geometry of a CFRC product/part, pre-forming fiber orientation and a desired reference fiber direction at a particular location on the product/part, FEA mesh model contains a number of shell finite elements associated with respective sets of material properties for carbon fibers and binding matrix

104 — Obtain a pre-forming 2-D shape of a workpiece used for manufacturing the product/part by conducting a one-step inverse numerical simulation that numerically expands the first FEA mesh model to a second FEA mesh model representing the 2-D shape based on numerically-calculated structural behaviors according to the first and the second sets of material properties, the one-step inverse numerical simulation includes operations 104a-104b in FIG. 1B

106 — Superimpose the pre-forming fiber orientation (number of fibers and relative angles) on the second FEA mesh model with the desired reference fiber direction being preserved

108 — Determine relative angles of all of the fibers on the first FEA mesh model by correlating the imposed fiber orientation of the second FEA mesh model to the first FEA mesh model

END

*FIG. 1A*

METHODS AND SYSTEMS FOR MANUFACTURING PRODUCTS/PARTS MADE OF CARBON FIBER REINFORCED COMPOSITE BASED ON NUMERICAL SIMULATIONS

CROSS-REFERENCE TO RELATED APPLICATIONS

This application is a continuation-in-part (CIP) to a co-pending U.S. patent application Ser. No. 15/898,426 for "Methods And Systems For Manufacturing Products/Parts Made Of Carbon Fiber Reinforced Composite Based On Numerical Simulations" filed on Feb. 17, 2018. The contents of which are hereby incorporated by reference in their entirety for all purposes.

FIELD

The invention generally relates to computer aided engineering analysis, more particularly to methods and systems for manufacturing products/parts made of carbon fiber reinforced composite (CFRC) based on numerical simulations.

BACKGROUND

Carbon fiber reinforced composite (CFRC) is an extremely strong and light fiber-reinforced plastic which contains carbon fibers. CFRCs are expensive to produce but are commonly used wherever high strength-to-weight ratio and rigidity are required, such as aerospace, automotive, civil engineering, sporting goods and an increasing number of other consumer and technical applications.

Material properties of the CFRC include two parts: binding matrix (e.g., epoxy in a resin system) and carbon fibers. Unlike isotropic materials like steel and aluminum, CFRC has directional strength properties. Properties of CFRC depend on the layouts of the carbon fiber and the proportion of the carbon fibers relative to the binding matrix. Initial fiber orientation and shape of pre-forming two-dimensional workpiece (i.e., hereinafter referred to as "prepreg") affect finished product. In order to reduce the design/production cycle time, carbon fiber layout in a prepreg needs to be predetermined. Many prior art approaches have been based on trial-and-error methods of determining a proper prepreg.

With advent of computer technology, computer aided engineering analysis (e.g., finite element analysis (FEA)) have been used for assisting engineers/scientists to design products and manufacturing procedures, for example, predicting initial shape and fiber orientation of a pre-forming workpiece made of CFRC. Then physical prepregs can be created according to the numerically-calculated initial shape and fiber orientation. In order to adequately and numerically calculating structural behaviors of a product/part/structure made of CFRC, material properties of CFRC are first obtained in a test laboratory. Prior art approaches have been treating CFRC as a single constitutive equation (i.e., stress-versus-strain relationship) by using various material types, for example, plastic, hyper-elastic, viscous-plastic and the likes. However, none of which can sufficiently characterize the mechanical behaviors of CFRC. In order to use numerical simulations to assist engineer to set up physical manufacturing of a product/part (e.g., prepreg configuration), it would be desirable to have improved methods and systems for numerically calculating structural behaviors of products/parts made of carbon fiber reinforced composite (CFRC).

SUMMARY

This section is for the purpose of summarizing some aspects of the invention and to briefly introduce some preferred embodiments. Simplifications or omissions in this section as well as in the abstract and the title herein may be made to avoid obscuring the purpose of the section. Such simplifications or omissions are not intended to limit the scope of the invention.

Systems and methods of manufacturing a product or part made of carbon fiber reinforced composite (CFRC) based on numerical simulations are disclosed. According to one aspect of the invention, a first FEA mesh model representing 3-D geometry of a CFRC product/part, pre-forming fiber orientation and desired reference fiber direction at a particular location on the product/part are received in a computer system. First FEA mesh model contains a number of finite elements associated with respective sets of material properties for carbon fibers and for binding matrix of CFRC. Pre-forming fiber orientation includes number of fibers and relative angles amongst the fibers. Pre-forming 2-D shape of a workpiece used for manufacturing the product/part is obtained by conducting a one-step inverse numerical simulation that numerically expands first FEA mesh model to second FEA mesh model representing the 2-D shape based on numerically-calculated structural behaviors according to respective sets of material properties. Pre-forming fiber orientation is superimposed on the second FEA mesh model with the desired reference fiber direction being preserved. Relative angles amongst all of the fibers on the product/part are then determined by correlating the superimposed fiber orientation of the second FEA mesh model to the first FEA mesh model. The numerical expansion is performed iteratively such that force equilibrium condition is met between all finite elements in the second FEA mesh model. Numerically-calculated structural behaviors of the second FEA mesh model are from combined effects of nonlinear elastic deformations from the carbon fibers and piecewise linear plastic deformations from the binding matrix. The nonlinear elastic deformations are calculated in accordance with a formula based on local deformation gradient between the desired reference fiber direction in the first FEA mesh model and current state of the second FEA mesh model.

In another aspect, numerically-obtained 2-D shape of a workpiece is used for setting up prepreg in physical manufacturing of the product/part, for example, size, shape, and fiber layout orientation of the prepreg.

Objects, features, and advantages of the invention will become apparent upon examining the following detailed description of an embodiment thereof, taken in conjunction with the attached drawings.

BRIEF DESCRIPTION OF THE DRAWINGS

These and other features, aspects, and advantages of the invention will be better understood with regard to the following description, appended claims, and accompanying drawings as follows:

FIGS. 1A-1B are collectively a flowchart illustrating an example process of manufacturing a product or part made of carbon fiber reinforced composite (CFRC) based on numerical simulations, according to an embodiment of the invention;

DETAILED DESCRIPTION

In the following description, numerous specific details are set forth in order to provide a thorough understanding of the invention. However, it will become obvious to those skilled in the art that the invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Additionally, used herein, the terms "horizontal", "vertical", "upper", "lower", "top", "bottom", "right", "left", "front", "back", "rear", "side", "middle", "upwards", and "downwards" are intended to provide relative positions for the purposes of description, and are not intended to designate an absolute frame of reference. Further, the order of blocks in process flowcharts or diagrams representing one or more embodiments of the invention do not inherently indicate any particular order nor imply any limitations in the invention.

Figure 1B:
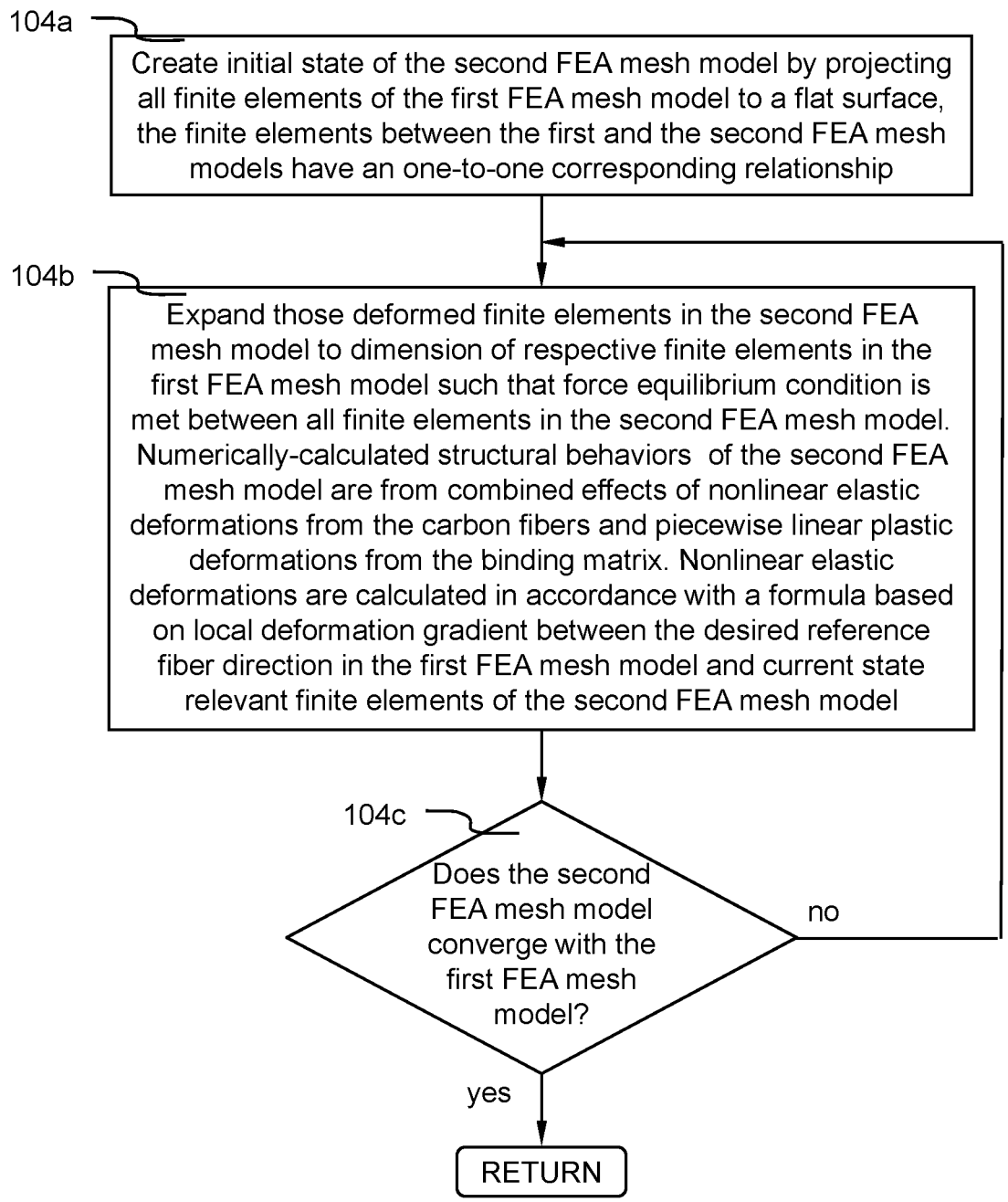
Figure 9:
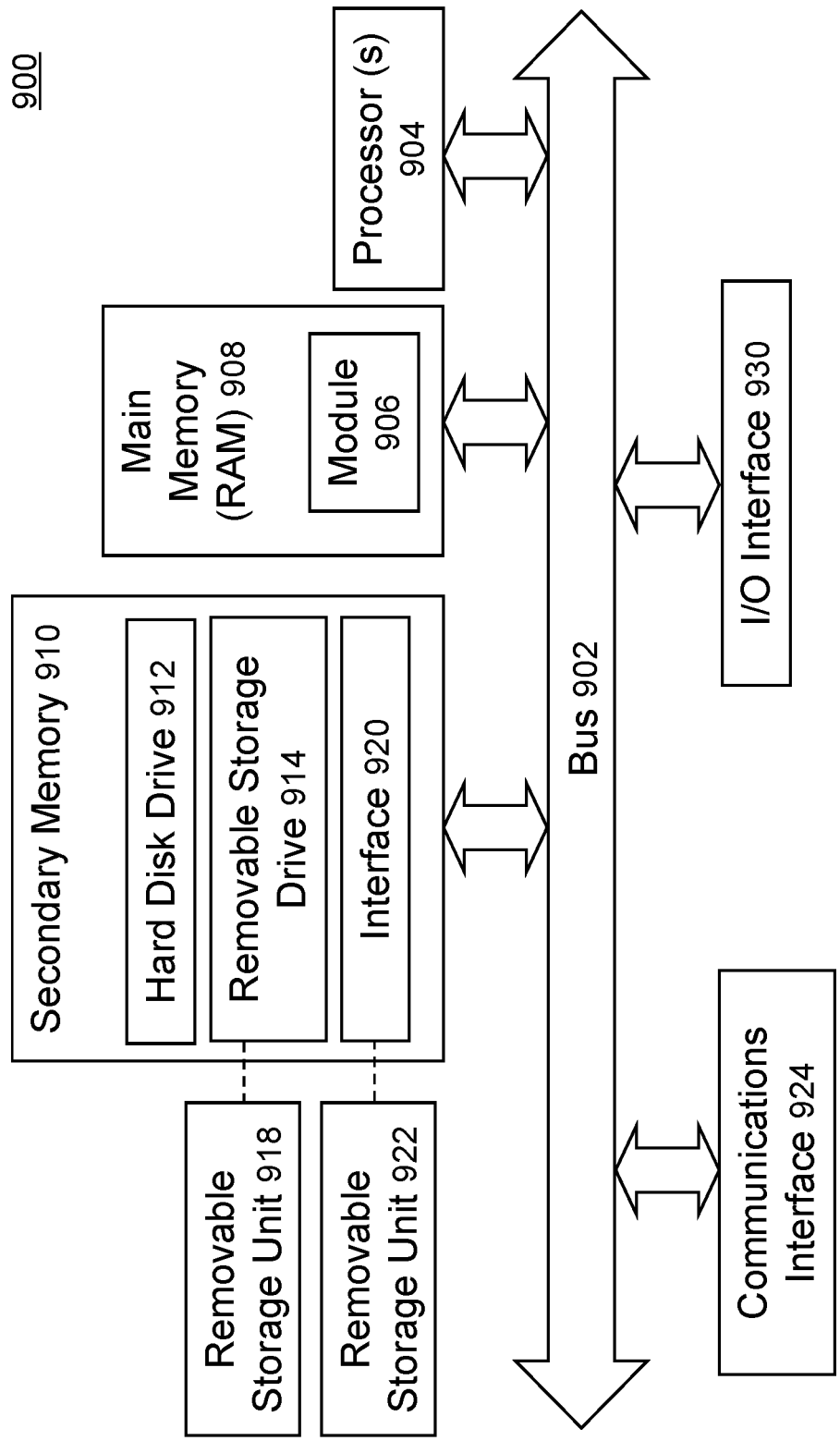
FIG. 9 is a function block diagram showing salient components of an exemplary computer, in which one embodiment of the invention may be implemented.

Embodiments of the invention are discussed herein with reference to FIGS. 1A-1B to FIG. 9. However, those skilled in the art will readily appreciate that the detailed description given herein with respect to these figures is for explanatory purposes as the invention extends beyond these limited embodiments.

Referring first to FIGS. 1A-1B, it is collectively shown a flowchart illustrating an example process 100 of manufacturing a product or part made of carbon fiber reinforced composite (CFRC) based on numerical simulations.

Process 100 starts by receiving a finite element analysis (FEA) mesh model representing a three-dimensional (3-D) geometry of a product or part made of CFRC, a pre-forming fiber orientation and a desired reference fiber direction at a particular location on the product/part in a computer system (e.g., computer system 900) at action 102. A FEA based application module capable of analyzing CFRC is installed on the computer system. It is critical for a product/part made of CFRC having a specific fiber pattern in forms of a desired reference fiber direction on finished product/part due to non-isotropic natural of CFRC.

The FEA mesh model contains a number of finite elements with each finite element associated with respective sets of material properties for carbon fibers and for binding matrix of CFRC. Example finite elements are shell elements.

Figure 2:
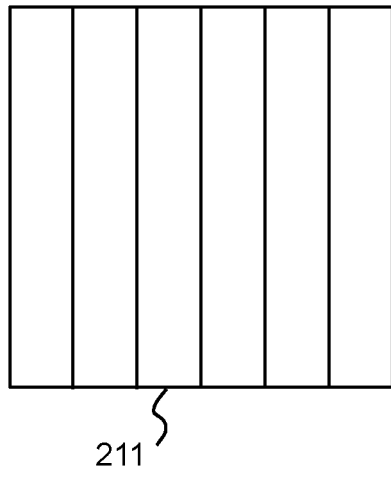
FIG. 2 shows various example fiber orientations of a CFRC workpiece in accordance with an embodiment of the invention.
Figure 2:
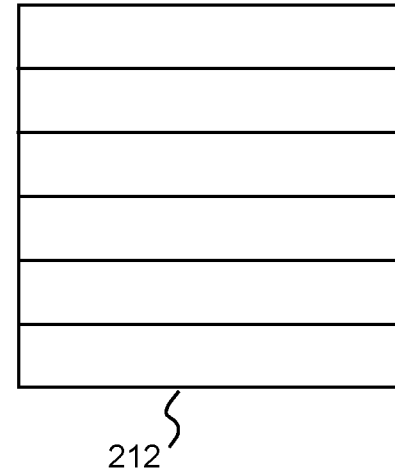
Figure 2:
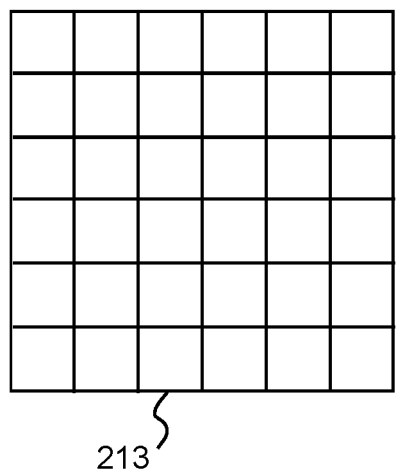
Figure 2:
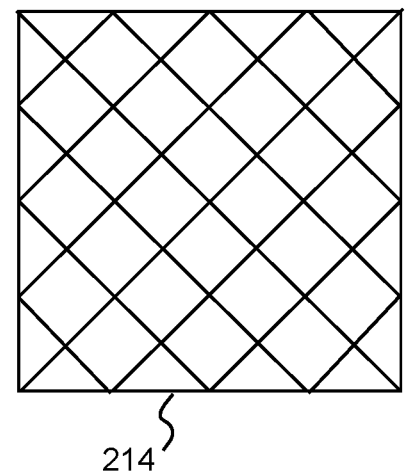
Figure 2:
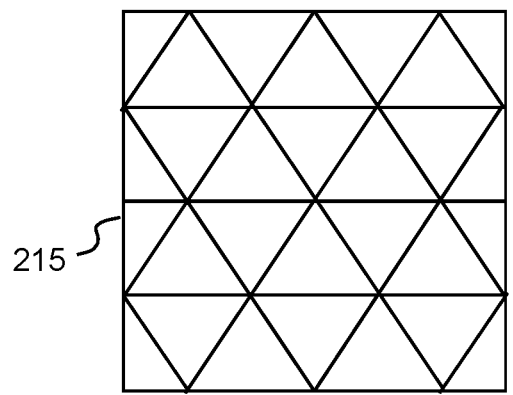

FIG. 2 shows various example fiber orientations of a CFRC workpiece. The first example 211 and the second example 212 have one-dimensional fiber orientation— straight lines. The only difference between first and second examples 211-212 is which direction the load acts. When the loading is in the same direction (i.e., 0-degree) with the fibers, the strength of CFRC workpiece is the strongest. When the loading is in the orthogonal direction (i.e., 90-degree), the strength of CFRC workpiece is the weakest. It is also noted that the second example 212 is just a 90-degree rotation of the first example 211.

The third example 213 contains fibers in both 0-degree and 90-degree directions, which make the CFRC workpiece having substantially equal strength in both directions. The fourth example 214 contains fibers in 45-degree and 135-degree directions, which is also has substantially equal strength in these two directions. Shape and fiber layout of a CFRC workpiece are critical factors during manufacturing. For example, the fourth example 214 is simply a 45-degree rotation of third example 213 in terms of fiber orientation. However, the third and fourth examples 213-214 have different shape for the exact same loading conditions during manufacturing/producing of a product/part. The fifth example 215 has three distinct fiber directions (i.e., 0-degree, 60-degree and 120-degree).

Figure 3:
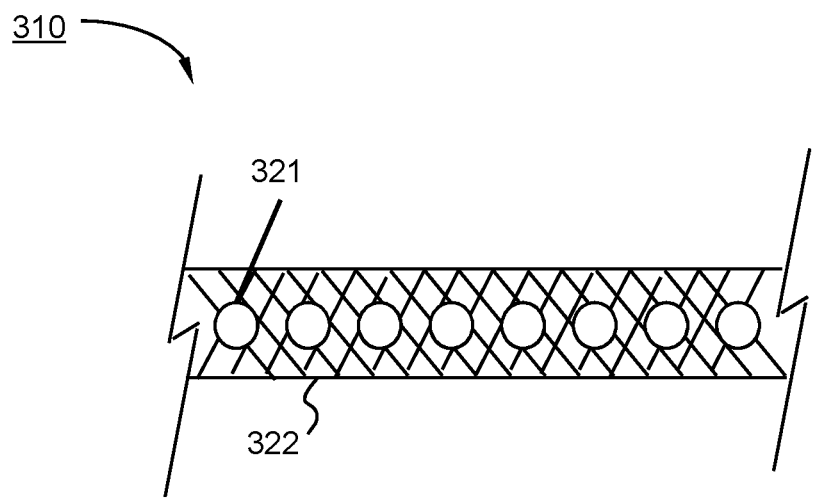
FIG. 3 is a diagram showing an example cross-section of CFRC in accordance with an embodiment of the invention.

For fiber layout containing more than one direction, the fibers are generally woven to each other. An example cross-section view 310 of a CFRC workpiece is shown in FIG. 3. It is shown the two portions: fibers 321 and binding matrix 322.

Figure 4:
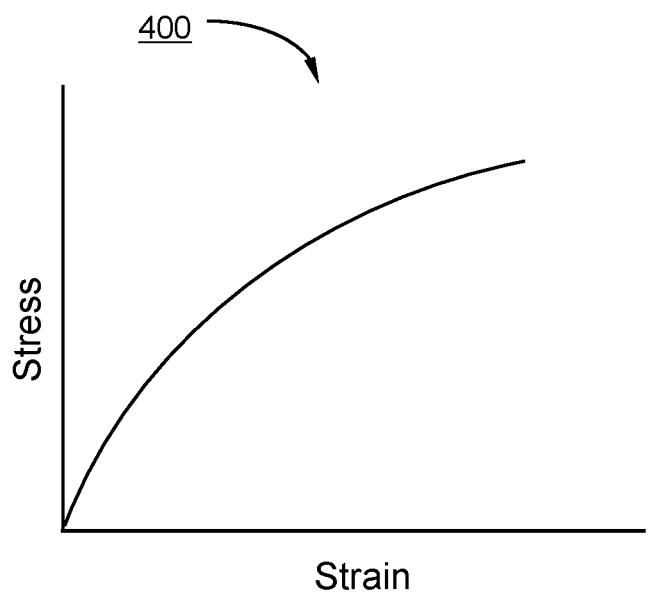
FIG. 4 is a diagram showing an example nonlinear elastic material constitutive relationship for fiber in accordance with one embodiment of the invention.
Figure 5:
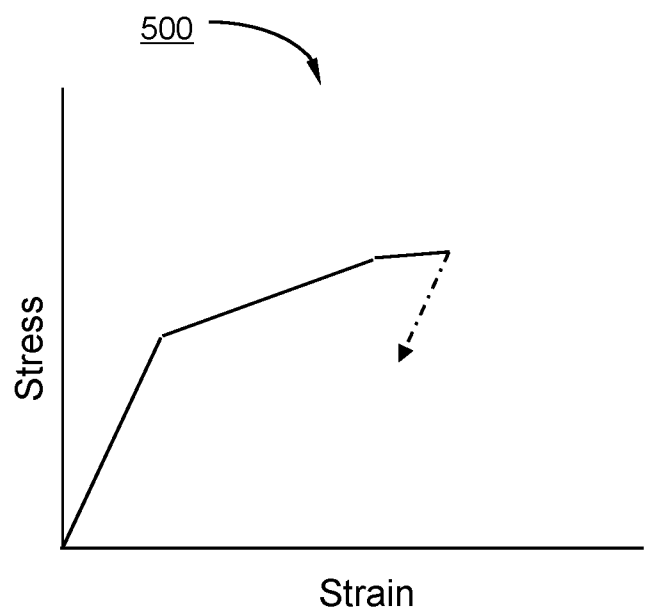
FIG. 5 is a diagram showing an example piecewise linear plastic constitutive relationship for binding matrix in accordance with one embodiment of the invention.

To represent mechanical behaviors of CFRC, both fiber and binding matrix must be properly represented in each finite element. For fiber portion, nonlinear elastic constitutive relationship (i.e., stress-versus-strain) in material properties is used. An example nonlinear elastic constitutive relationship 400 is shown in FIG. 4. An example piecewise linear plastic constitutive relationship 500 shown in FIG. 5 is used for representing binding matrix.

Referring back to process 100, at action 104, a pre-forming two-dimensional (2-D) shape of a workpiece used for producing/manufacturing the finished product/part is obtained by conducting a one-step inverse numerical simulation that numerically expands the first FEA mesh model to a second FEA mesh model representing the 2-D shape. The one-step inverse numerical analysis is based on numerically-calculated structural behaviors according to respective sets of material properties.

At action 104*a*, all of the finite elements in the first FEA mesh model are projected to a flat surface to create an initial state of the second FEA mesh model. As a result, each finite element in the second FEA mesh model has a one-to-one relationship with a corresponding finite element in the first FEA mesh model.

Next, at action 104*b*, those deformed finite elements in the initial state of the second FEA mesh model are numerically expanded to dimension of respective finite elements in the first FEA mesh model. A force equilibrium condition is met for all finite elements in the second FEA mesh model based on numerically-calculated structural behaviors from combined effects of nonlinear elastic deformations from the carbon fibers and piecewise linear plastic deformations from the binding matrix. Nonlinear elastic deformations are calculated in accordance with a formula based on local deformation gradient between the desired reference fiber direction in the first FEA mesh model and current state relevant finite elements of the second FEA mesh model.

Figure 7:
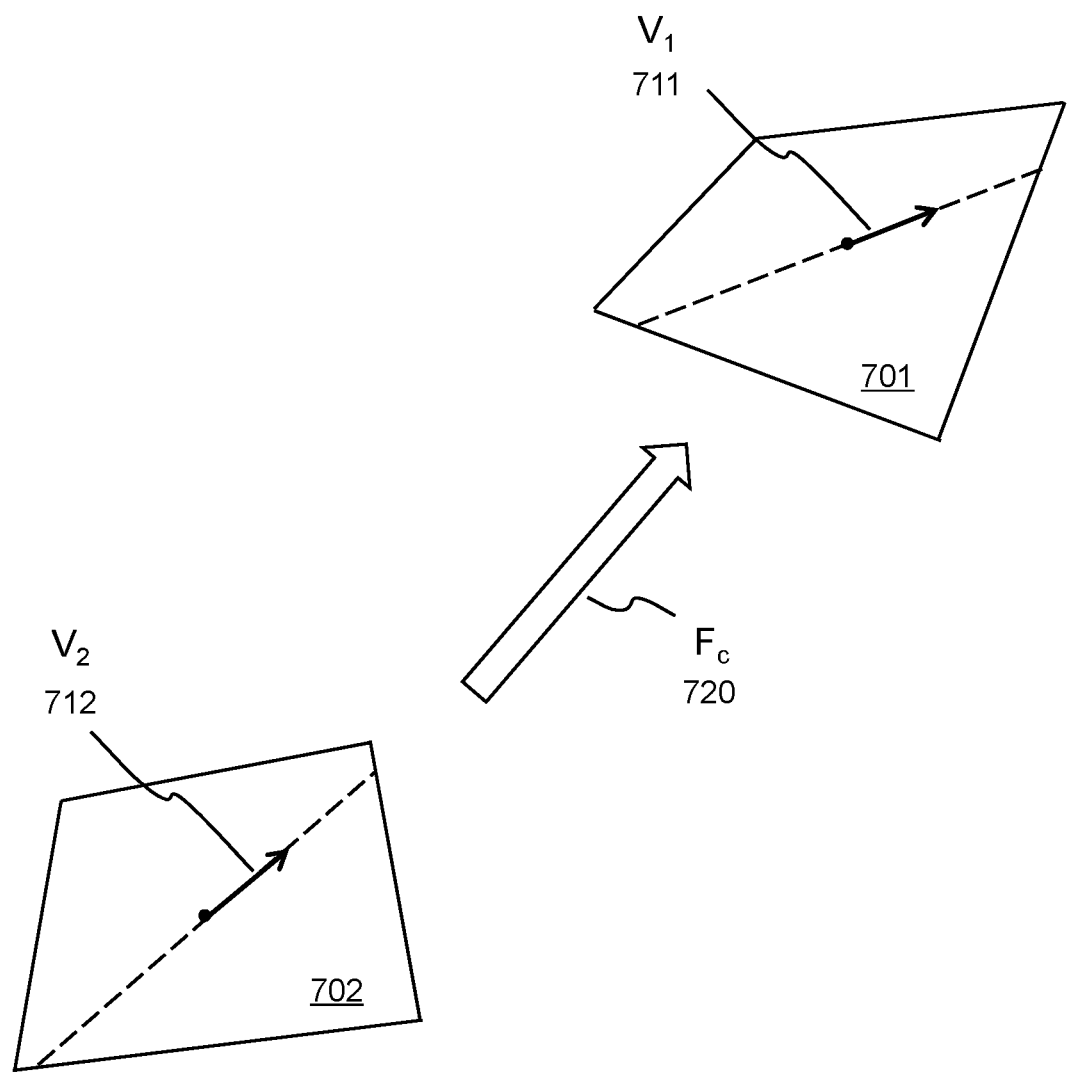
FIG. 7 is a schematic diagram showing deformation gradient between respective example finite elements in accordance with one embodiment of the invention.

FIG. 7 is a schematic diagram showing deformation gradient between respective example finite elements. The formula has the following form:

$$V_2 = \frac{F_c^{-1} V_1}{L_c} \text{ and } L_c = \|F_c^{-1} V_1\|,$$

where $V_1$ 711 is a unit vector representing the desired reference fiber direction, $F_c$ 720 is a tensor representing the local deformation gradient from a particular finite element 702 in the second FEA mesh model to a corresponding finite element 701 in the first FEA mesh model, and $V_2$ 712 is an unknown unit vector representing fiber direction in the corresponding finite element of the second FEA mesh model. Vector $V_1$ 711 is located at mass center of a finite element 701 in the first FEA mesh model representing 3-D geometry. Vector $V_2$ 712 is located at mass center of a corresponding finite element 702 in the second FEA mesh model representing 2-D flatten shape. $L_c$ is a length or a magnitude used for calculating the unit vector $V_2$ 712. Deformation gradient is used for quantifying the change in shape of infinitesimal line segment within a solid. In one embodiment, $F_c$ 720 is represented with a 3×3 tensor, while $V_1$ 711 and $V_2$ 712 are 3×1 vectors in three-dimensional space.

Referring back to FIG. 1B, action 104 moves to decision 104*c*. It is determined whether all finite elements in the second FEA mesh model converge with respective finite elements in the first FEA mesh model. If not, action 104 follows the 'no' branch to repeat action 104*b* until decision 104*c* becomes true. Action 104 returns to process 100 thereafter. To determine convergence can be achieved with a number of well known techniques, for example, comparing the shape and area of two corresponding finite elements.

Figure 6A:
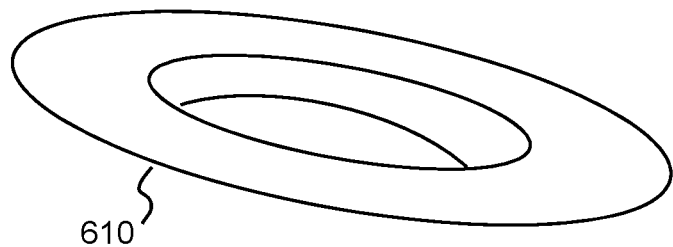
FIGS. 6A-6D are schematic diagrams showing an example scenario of numerically expanding 3-D geometry of a product/part to a pre-forming 2-D shape in a one-step inverse numerical simulation, according to one embodiment of the invention.
Figure 6B:
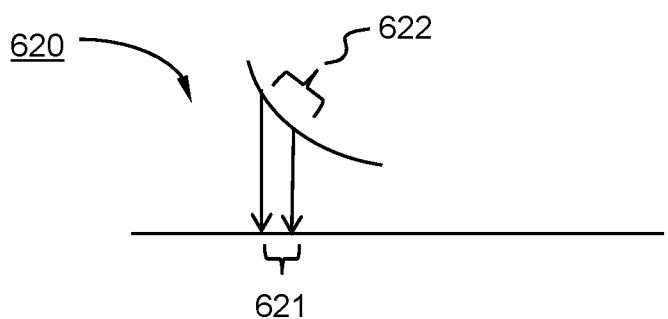
Figure 6C:
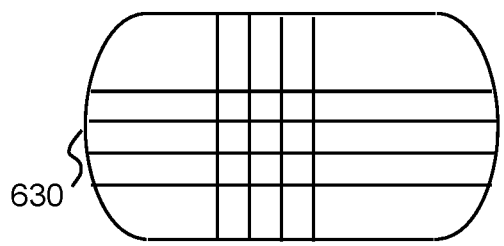
Figure 6D:
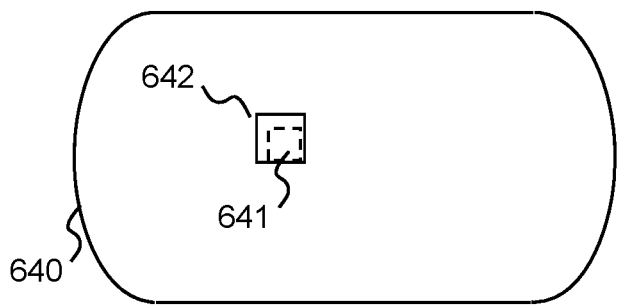

FIG. 6A-6D illustrates an example sequence of actions 104 including at least actions 104*a*-104*c* shown in FIG. 1B. An example 3-D geometry 610 of a product/part is shown in FIG. 6A. FIG. 6B is an elevation view 620 showing an example projection scheme of finite elements of the first FEA mesh model to a flat surface. Initial state 630 of a second FEA mesh model representing pre-forming 2-D shape of a workpiece (i.e., "prepreg") is created as shown in FIG. 6C. Finally, each deformed finite element in the second FEA mesh model is numerically expanded such that all finite elements in the second model are in force equilibrium. For example as shown in FIG. 6D, a deformed finite element 641 is numerically expanded to finite element 642. In other words, the deformed element 641 is expanded from the deformed dimension 621 to a corresponding dimension 622. As a result, the pre-forming 2-D shape 640 of a workpiece is obtained. In the one-step inverse numerical simulation, numerically-calculated structural behaviors are obtained from combined effects of nonlinear elastic deformations from the carbon fibers and piecewise linear plastic deformations from the binding matrix.

Figure 8A:
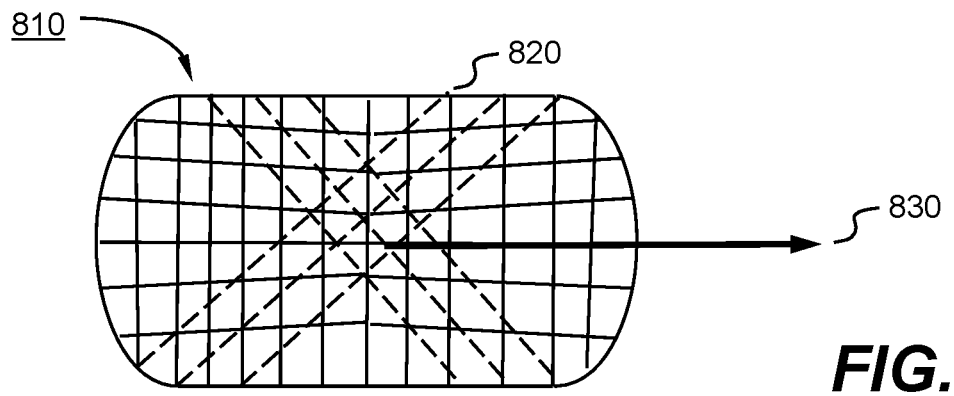
FIGS. 8A-8C are schematic diagrams showing example determination of relative angles of fiber orientation on the finished product/part, according to one embodiment of the invention.

After the pre-forming 2-D shape has been obtained, at action 106, the pre-forming fiber orientation is superimposed on the second FEA mesh model with the desired reference fiber direction being preserved. FIG. 8A shows an example second FEA mesh model 810 with an example fiber orientation 820 (i.e., dotted lines) imposed thereon. The bold line arrow 830 is the desired fiber reference direction which is a requirement of manufacturing the product/part. In the example shown in FIG. 8A, there are two distinct fibers with a relative angle of 90-deg. There is no restriction with regards to the fiber orientations, other example fiber orientations are shown in FIG. 2.

Figure 8B:
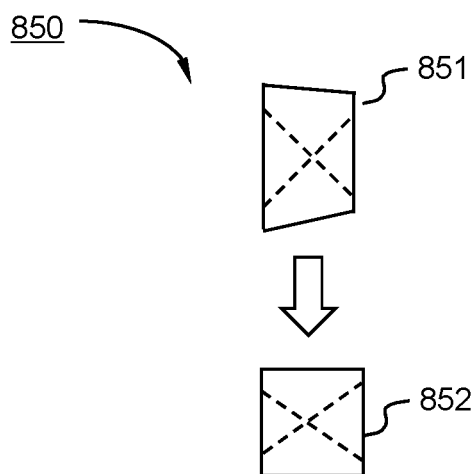
Figure 8C:
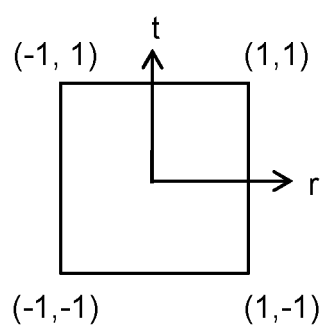

Finally, at action 108, relative angles of all of the fibers on the first FEA mesh model are determined by correlating the superimposed fiber orientation of the second FEA mesh model to the first FEA mesh model. An example correlating scheme 850 is shown in FIG. 8B. A finite element 851 of the second FEA mesh model with imposed pre-forming fiber orientation is mapped to a corresponding finite element 852 of the first FEA mesh model. The relative angle of the imposed pre-forming fiber orientation is 90-degree, while the mapped relative angle is not 90-degree due to correlation. One example mapping or correlating scheme is to use parametric coordinates of a quadrilateral finite element. Parametric coordinate system (r, t) is shown in FIG. 8C.

According to one aspect, the invention is directed towards one or more special-purpose programmed computer systems capable of carrying out the functionality described herein. An example of a computer system 900 is shown in FIG. 9. The computer system 900 includes one or more processors, such as processor 904. The processor 904 is connected to a computer system internal communication bus 902. Various software embodiments are described in terms of this exemplary computer system. After reading this description, it will become apparent to a person skilled in the relevant art(s) how to implement the invention using other computer systems and/or computer architectures.

Computer system 900 also includes a main memory 908, preferably random access memory (RAM), and may also include a secondary memory 910. The secondary memory 910 may include, for example, one or more hard disk drives 912 and/or one or more removable storage drives 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc. which is read by and written to by removable storage drive 914. As will be appreciated, the removable storage unit 918 includes a computer readable storage medium having stored therein computer software and/or data.

In alternative embodiments, secondary memory 910 may include other similar means for allowing computer programs or other instructions to be loaded into computer system 900. Such means may include, for example, a removable storage unit 922 and an interface 920. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 922 and interfaces 920 which allow software and data to be transferred from the removable storage unit 922 to computer system 900. In general, Computer system 900 is controlled and coordinated by operating system (OS) software, which performs tasks such as process scheduling, memory management, networking and I/O services.

There may also be a communications interface 924 connecting to the bus 902. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924. The computer 900 communicates with other computing devices over a data network based on a special set of rules (i.e., a protocol). One of the common protocols is TCP/IP (Transmission Control Protocol/Internet Protocol) commonly used in the Internet. In general, the communication interface 924 manages the assembling of a data file into smaller packets that are transmitted over the data network or reassembles received packets into the original data file. In addition, the communication interface 924 handles the address part of each packet so that it gets to the right destination or intercepts packets destined for the computer 900. In this document, the terms "computer program medium", "computer readable medium", "computer recordable medium" and "computer usable medium" are used to generally refer to media such as removable storage drive 914 (e.g., flash storage drive), and/or a hard disk installed in hard disk drive 912. These computer program products are means for providing software to computer system 900. The invention is directed to such computer program products.

The computer system 900 may also include an input/output (I/O) interface 930, which provides the computer system 900 to access monitor, keyboard, mouse, printer, scanner, plotter, and the likes.

Computer programs (also called computer control logic) are stored as application modules 906 in main memory 908 and/or secondary memory 910. Computer programs may also be received via communications interface 924. Such computer programs, when executed, enable the computer system 900 to perform the features of the invention as discussed herein. In particular, the computer programs, when executed, enable the processor 904 to perform features of the invention. Accordingly, such computer programs represent controllers of the computer system 900.

In an embodiment where the invention is implemented using software, the software may be stored in a computer program product and loaded into computer system 900 using removable storage drive 914, hard drive 912, or communications interface 924. The application module 906, when executed by the processor 904, causes the processor 904 to perform the functions of the invention as described herein.

The main memory 908 may be loaded with one or more application modules 906 that can be executed by one or more processors 904 with or without a user input through the I/O interface 930 to achieve desired tasks. In operation, when at least one processor 904 executes one of the application modules 906, the results are computed and stored in the secondary memory 910 (i.e., hard disk drive 912). Results of the analysis (e.g., computed geometry of the product/part) are reported to the user via the I/O interface 930 either in a text or in a graphical representation upon user's instructions.

Although the invention has been described with reference to specific embodiments thereof, these embodiments are merely illustrative, and not restrictive of, the invention. Various modifications or changes to the specifically disclosed exemplary embodiments will be suggested to persons skilled in the art. Whereas only a few fibers have been shown and describe, there are generally many more in CFRC, for example, hundreds or even thousands. Additionally, only one type of woven pattern has been shown and described, other types may be used for achieving the same in the invention. In summary, the scope of the invention should not be restricted to the specific exemplary embodiments disclosed herein, and all modifications that are readily suggested to those of ordinary skill in the art should be included within the spirit and purview of this application and scope of the appended claims.

We claim:

1. A method of numerically simulating manufacturing procedure of a product or part made of carbon fiber reinforced composite (CFRC) comprising:

receiving, in a computer system having finite element analysis (FEA) based application module capable of analyzing CFRC installed thereon, a first FEA mesh model representing a three-dimensional (3-D) geometry of a product or part made of CFRC that includes carbon fibers and binding matrix, a pre-forming fiber orientation of a workpiece and a reference fiber direction at a location on the product or part;

obtaining, with the FEA based application module, a pre-forming two-dimensional (2-D) shape of the workpiece used for manufacturing the product or part by conducting a simulation that numerically expands the first FEA mesh model to a second FEA mesh model based on numerically-calculated structural behaviors that include nonlinear elastic deformations of the carbon fibers coupled with piecewise linear plastic deformations of the binding matrix, wherein the nonlinear elastic deformations are calculated in accordance with a formula based on a local deformation gradient between the first FEA mesh model and the second FEA mesh model;

superimposing, with the FEA based application module, the pre-forming fiber orientation on the second FEA mesh model with the reference fiber direction being preserved; and determining, with the FEA based application module, relative angles amongst all of the carbon fibers on the product or part by correlating the superimposed pre-forming fiber orientation of the second FEA mesh model to the first FEA mesh model.

2. The method of claim 1, wherein the second FEA mesh model represents the pre-forming 2-D shape and contains same number of finite elements of the first FEA mesh model in a one-to-one corresponding relationship.

3. The method of claim 2, wherein said obtaining the pre-forming 2-D shape of the workpiece comprises projecting all of the finite elements of the first FEA model to a flat surface to create an initial stat of the second FEA mesh model; and expanding those deformed finite elements in the initial state to a dimension of corresponding finite elements in the first FEA mesh model such that a force equilibrium condition is met.

4. The method of claim 3, wherein each finite element of the second FEA mesh model is horizontally expandable on the flat surface.

5. The method of claim 1, wherein the formula comprises $$V_2 = \frac{F_c^{-1} V_1}{L_c} \text{ and } L_c = \|F_c^{-1} V_1\|,$$

where $V_1$ is a unit vector representing the reference fiber direction, $F_c$ is a tensor representing the local deformation gradient from a finite element in the second FEA mesh model to a corresponding finite element in the first FEA mesh model, $L_c$ is a magnitude used for calculating $V_2$, and $V_2$ is an unknown unit vector representing fiber direction in the finite element of the second FEA mesh model.

6. The method of claim 1, wherein each finite element comprises a two-dimensional shell finite element.

7. A system for numerically simulating manufacturing procedure of a product or part made of carbon fiber reinforced composite (CFRC) comprising:
A bus;
a memory for storing computer readable code for a finite element analysis (FEA) based application module capable of analyzing CFRC;
at least one processor coupled to the bus and the memory, said at least one processor executing the computer readable code from the memory to perform a method comprising:
receiving a first FEA mesh model representing a three-dimensional (3-D) geometry of a product or part made of CFRC that includes carbon fibers and binding matrix, a pre-forming fiber orientation of a workpiece and a reference fiber direction at a location on the product or part;
obtaining a pre-forming two-dimensional (2-D) shape of the workpiece used for manufacturing the product or part by conducting a simulation that numerically expands the first FEA mesh model to a second FEA mesh model based on numerically-calculated structural behaviors that include nonlinear elastic deformations of the carbon fibers coupled with piecewise linear plastic deformations of the binding matrix, wherein the nonlinear elastic deformations are calculated in accordance with a formula based on a local deformation gradient between the first FEA mesh model and the second FEA mesh model;
superimposing the pre-forming fiber orientation on the second FEA mesh model with the reference fiber direction being preserved; and
determining relative angles amongst all of the carbon fibers on the product or part by correlating the superimposed pre-forming fiber orientation of the second FEA mesh model to the first FEA mesh model.

8. The system of claim 7, wherein the second FEA mesh model represents the pre-forming 2-D shape and contains same number of finite elements of the first FEA mesh model in a one-to-one corresponding relationship.

9. The system of claim 8, wherein said obtaining the pre-forming 2-D shape of the workpiece comprises projecting all of the finite elements of the first FEA model to a flat surface to create an initial state of the second FEA mesh model; and expanding those deformed finite elements in the initial state to a dimension of corresponding finite elements in the first FEA mesh model such that a force equilibrium condition is met.

10. The system of claim 9, wherein each finite element of the second FEA mesh model is horizontally expandable on the flat surface.

11. The system of claim 7, wherein the formula comprises $$V_2 = \frac{F_c^{-1} V_1}{L_c} \text{ and } L_c = \|F_c^{-1} V_1\|,$$

where $V_1$ is a unit vector representing the reference fiber direction, $F_c$ is a tensor representing the local deformation gradient from a finite element in the second FEA mesh model to a corresponding finite element in the first FEA mesh model, $L_c$ is a magnitude used for calculating $V_2$, and $V_2$ is an unknown unit vector representing fiber direction in the finite element of the second FEA mesh model.

12. The system of claim 7, wherein each finite element comprises a two-dimensional shell finite element.

13. A non-transitory computer readable medium containing instructions which, when executed in one or more processors, perform a method for numerically simulating manufacturing procedure of a product or part made of carbon fiber reinforced composite (CFRC) comprising:
receiving, in a computer system having finite element analysis (FEA) based application module capable of analyzing CFRC installed thereon, a first FEA mesh model representing a three-dimensional (3-D) geometry of a product or part made of CFRC that includes carbon fibers and binding matrix, a pre-forming fiber orientation of a workpiece and a reference fiber direction at a location on the product or part;
obtaining, with the FEA based application module, a pre-forming two-dimensional (2-D) shape of the workpiece used for manufacturing the product or part by conducting a simulation that numerically expands the first FEA mesh model to a second FEA mesh model based on numerically-calculated structural behaviors that include nonlinear elastic deformations of the carbon fibers coupled with piecewise linear plastic deformations of the binding matrix, wherein the nonlinear elastic deformations are calculated in accordance with a formula based on a local deformation gradient between the first FEA mesh model and the second FEA mesh model;
superimposing, with the FEA based application module, the pre-forming fiber orientation on the second FEA mesh model with the reference fiber direction being preserved; and
determining, with the FEA based application module, relative angles amongst all of the carbon fibers on the product or part by correlating the superimposed pre-forming fiber orientation of the second FEA mesh model to the first FEA mesh model.

14. The non-transitory computer readable medium of claim 13, wherein the second FEA mesh model represents the pre-forming 2-D shape and contains same number of finite elements of the first FEA mesh model in a one-to-one corresponding relationship.

15. The non-transitory computer readable medium of claim 14, wherein said obtaining the pre-forming 2-D shape of the workpiece comprises projecting all of the finite elements of the first FEA model to a flat surface to create an initial state of the second FEA mesh model; and expanding those deformed finite elements in the initial state to a dimension of corresponding finite elements in the first FEA mesh model such that a force equilibrium condition is met.

16. The non-transitory computer readable medium of claim 15, wherein each finite element of the second FEA mesh model is horizontally expandable on the flat surface.

17. The non-transitory computer readable medium of claim 13, wherein the formula comprises $$V_2 = \frac{F_c^{-1} V_1}{L_c} \text{ and } L_c = \|F_c^{-1} V_1\|,$$

where $V_1$ is a unit vector representing the reference fiber direction, $F_c$ is a tensor representing the local deformation gradient from a finite element in the second FEA mesh model to a corresponding finite element in the first FEA mesh model, $L_c$ is a magnitude used for calculating $V_2$, and $V_2$ is an unknown unit vector representing fiber direction in the finite element of the second FEA mesh model.

18. The non-transitory computer readable medium of claim 13, wherein each finite element comprises a two-dimensional shell finite element.

* * * * *